(12) United States Patent
Schuster

(10) Patent No.: US 9,430,455 B2
(45) Date of Patent: Aug. 30, 2016

(54) METHODS AND SYSTEMS FOR INTELLIGENT FORM-FILLING AND ELECTRONIC DOCUMENT GENERATION

(75) Inventor: James V. Schuster, Cincinnati, OH (US)

(73) Assignee: Simpliance, Inc., Cincinnati, OH (US)

( * ) Notice: Subject to any disclaimer, the term of this patent is extended or adjusted under 35 U.S.C. 154(b) by 1030 days.

(21) Appl. No.: 12/582,342

(22) Filed: Oct. 20, 2009

(65) Prior Publication Data

US 2010/0179962 A1 Jul. 15, 2010

Related U.S. Application Data

(63) Continuation of application No. 11/611,840, filed on Dec. 15, 2006, now abandoned.

(60) Provisional application No. 60/560,234, filed on Dec. 15, 2005.

(51) Int. Cl.

| G06F 17/00 | (2006.01) |
|---|---|
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.
CPC .................................. *G06F 17/243* (2013.01)

(58) Field of Classification Search
CPC .. G06F 17/243; G06F 17/00; G06F 17/2247; G06F 17/2785; G06F 17/30398
USPC ................................ 715/224, 226, 221, 222
See application file for complete search history.

(56) References Cited

U.S. PATENT DOCUMENTS

| 5,144,693 | A |   | 9/1992 | Morgan |
|---|---|---|---|---|
| 5,317,646 | A |   | 5/1994 | Sang et al. |
| 5,574,905 | A |   | 11/1996 | DeCarmo |
| 5,704,029 | A | * | 12/1997 | Wright, Jr. ................... 715/223 |
| 5,745,712 | A | * | 4/1998 | Turpin ................. G06F 17/243 715/221 |
| 5,874,955 | A |   | 2/1999 | Rogowitz et al. |
| 6,236,994 | B1 |   | 5/2001 | Swartz et al. |
| 6,341,287 | B1 |   | 1/2002 | Sziklai et al. |
| 6,385,589 | B1 |   | 5/2002 | Trusheim et al. |

(Continued)

OTHER PUBLICATIONS

Ka-Wing Wong and Hossein Saiedian "Intelligent Forms", ACM SIGICE Bulletin vol. 21, Issue 3 (Jan. 1996) pp. 20-27.

(Continued)

*Primary Examiner* — Manglesh M Patel
*Assistant Examiner* — Nicholas Hasty
(74) *Attorney, Agent, or Firm* — Dinsmore & Shohl LLP

(57) ABSTRACT

Methods and systems are disclosed for intelligent form-filling and electronic document generation. One method may include generating a decision tree representing questions which facilitates the completion of a form having one or more data fields. The method may comprise: inputting the questions into a computing device, wherein the questions relate to data to be filled into the one or more data fields of the form; arranging an order of the questions in the computing device based on possible answers given; and using the computing device to automatically generate the decision tree based on the questions, the possible answers, and the order of the questions.

18 Claims, 6 Drawing Sheets

(56) References Cited

U.S. PATENT DOCUMENTS

| | | |
|---|---|---|
| 6,493,693 B1 | 12/2002 | Hill |
| 6,529,876 B1 | 3/2003 | Dart et al. |
| 6,613,099 B2 | 9/2003 | Crim |
| 6,912,502 B1 | 6/2005 | Buddle et al. |
| 7,032,170 B2 | 4/2006 | Poulose et al. |
| 7,200,806 B2 * | 4/2007 | Sahu ............... G06F 17/243 715/224 |
| 7,376,891 B2 * | 5/2008 | Hitchock ........... G06F 17/243 715/221 |
| 7,447,988 B2 * | 11/2008 | Ross ........................... 715/221 |
| 7,475,333 B2 | 1/2009 | Otter et al. |
| 7,487,438 B1 * | 2/2009 | Withers ....................... 715/223 |
| 7,523,391 B1 * | 4/2009 | Eizenhoefer ................. 715/224 |
| 8,370,228 B1 * | 2/2013 | Jacobs ......................... 705/31 |
| 2001/0034744 A1 | 10/2001 | Honma et al. |
| 2002/0095654 A1 | 7/2002 | Fukase et al. |
| 2002/0120474 A1 * | 8/2002 | Hele ................. G06Q 10/10 705/4 |
| 2002/0143595 A1 | 10/2002 | Frank et al. |
| 2002/0167548 A1 * | 11/2002 | Murray ....................... 345/825 |
| 2002/0184068 A1 | 12/2002 | Krishnan et al. |
| 2003/0069983 A1 | 4/2003 | Mukund |
| 2003/0088452 A1 * | 5/2003 | Kelly ................. G06Q 30/02 705/7.32 |
| 2003/0153991 A1 | 8/2003 | Visser et al. |
| 2003/0158759 A1 | 8/2003 | Kannenberg |
| 2003/0172343 A1 | 9/2003 | Leymaster et al. |
| 2004/0039991 A1 | 2/2004 | Hopkins et al. |
| 2004/0073868 A1 | 4/2004 | Easter et al. |
| 2004/0139421 A1 | 7/2004 | Hall |
| 2005/0228685 A1 | 10/2005 | Schuster et al. |
| 2005/0257134 A1 * | 11/2005 | Goodman et al. ............ 715/507 |
| 2007/0300145 A1 | 12/2007 | Perelman et al. |
| 2013/0198628 A1 * | 8/2013 | Ethier et al. .................. 715/709 |

OTHER PUBLICATIONS

M. Frank and P. Szekely, Adaptive Forms: An interaction paradigm for entering structured data. In Proceedings of the ACM International Conference on Intelligent User Interfaces, pp. 153-160, (San Francisco, California, Jan. 6-9) 1998.

* cited by examiner

METHODS AND SYSTEMS FOR INTELLIGENT FORM-FILLING AND ELECTRONIC DOCUMENT GENERATION

RELATED APPLICATIONS

This application is a continuation of application Ser. No. 11/611,840, filed Dec. 15, 2006, which claims the benefit of U.S. Provisional Application No. 60/560,234, filed Dec. 15, 2005.

TECHNICAL FIELD

The present invention relates to methods and systems for intelligent form-filling and electronic document generation and, specifically, to generating decision trees based on a form description language. It also relates to the controlled filling out of paper and web based forms and generating electronic documents by designing the form using a form description language, restricting the questioning based on the previous user's answers, and predefined document templates.

BACKGROUND

Society often requires the filling out of forms, such as a government compliance form, a tax return, a loan application, or a job application. The government (both state and federal) has thousands of forms that individuals and/or companies are expected to fill out for a specific request or on a regular basis.

A form is a list of questions organized into relevant groups of data fields that a user needs to answer. A form may have a predefined rigid structure to help the repeated filling out and the further processing and may include a field for a signature. Forms may be in paper or electronic format.

Paper forms are often stored, transferred, and processed mostly by manual labor, that is slow and of low efficiency. The paper forms are inflexible, can be understood only via reading lengthy instructions. The instructions often refer to data that is only partially available. The instructions often use language (i.e. in government dialect) that is only partially understandable for the layperson and may not be explained. This may lead to misunderstanding and to an elaborate error-fixing process after the form is completed that necessitates time consuming, additional processing. A common practice is to hire out an expensive specialist who will fill out the forms on behalf of the individual or the company.

An example of a common and complex paper form is the individual tax return (Form 1040). This form contains about 150 fields (without the attachments); but an average user will need to fill out only about 60 of those fields, of which 10 are aggregated fields that could be derived from the already given answers (e.g. subtract line 33 from line 22). The instructions for the tax return comprise 32 pages.

Not all the questions on a form are relevant to the user's situation. The paper forms often have an embedded logic that the user needs to be able to follow in order to make decisions about how to fill out the form. Typically, the more complex the form is, the less fields have to be filled out based on the user's situation. Yet the user needs to process the whole form in order to understand which fields need to be filled out and which fields can be left empty.

The paper forms are independent and do not know about one another. Even if the same identification data (e.g. name and address of the company, phone numbers, tax id, etc.) has to be put into each form, it has to be repeatedly put into each form separately.

The currently available electronic form filling solutions basically implement the paper form structure (e.g. Microsoft Word or Adobe Acrobat and other Adobe products). The decision about what fields to fill in are still based on the user's following the complicated instructions. The user still needs to go through each field and determine whether the information is needed or not. The identification data for the same user (e.g. name, address, etc.) still needs to be added to each form separately. Though these documents are often called intelligent or smart documents, the intelligence is limited to localized help, error checking, or calculations in certain data fields. The data collected in one form is not accessible to another form.

A Microsoft Word or an Adobe PDF document can be protected by a digital signature. In the usual process of form filling, the user fills out the form, signs the document, and forwards it to the agency requiring the form. Once a document is digitally signed it cannot be converted to a programmatically accessible format from which relevant data can be extracted. The receiving agency cannot use the digitally signed document to extract e.g. statistical data via a program without further manual processing (e.g. printing, scanning, converting, and error checking again). Thus the existing solution (i.e., combining the filling out a form in Microsoft Word or Adobe Acrobat and signing it digitally) will not produce easily extractable raw data.

Some of the currently available electronic form filling solutions (e.g. tax return generator programs like TurboTax) are able to control the questioning and thus interpret the instructions to help the user. These applications are hard coded as computer programs. If the form is changed, the corresponding program needs to be changed as well. Creating an electronic form involves the writing of a new computer program. These processes are also time consuming and error prone. Yet, a form represents knowledge and it is the nature of the knowledge to change from time to time.

The internet provides a convenient framework for filling out online forms. The current electronic form filling methods (e.g. those provided for the public by the government offices like the Department of Labor, the Patent Office, the Securities and Exchange, or the Internal Revenue Service) are still relegated to manually signed paper documents as the final result. Such paper documents are scanned in as images, but the images are not searchable. Though the paper images can be transformed to text file through OCR scanning, this technology requires a human final check that is still error prone and time consuming. For this reason, because of the missing electronic equivalent of a signed paper document, the paperless office is still not working on the society level.

Consequently, and for the above delineated reasons, there exists a need for a faster, simpler way of filling out forms (both paper and online forms), creating legally binding documents that are completely electronic and not paper-based, and still permit the further processing of the accumulated data.

SUMMARY

The present disclosure provides a system and method for filling out paper and online forms that create electronic documents. A central concept is separating the form into a form description (decision tree), a document template, and the engine (server). The form description (decision tree) may be defined by the atoms of a form description language and specifies the logic and the format of the form execution. Separating the form description and the document template from the form execution makes the form design or change faster, more robust, and less prone to errors. One embodiment includes a solution for creating and filling out electronic forms or other electronic documents using the form description language and an interpreter/runtime system that is executing the instructions (e.g., atoms) described by the language.

The user is guided through the questions in the decision tree. Each question represents one or more data fields in the form. Only the questions relevant to the previous answers are asked. At each question, a locally relevant, detailed, hierarchical help may be provided. The user is given details about the conclusions that the system deduced based on his/her full or partial answers. The forms filled out by the same user may be associated with one another, so data available from the profile (higher level forms containing identification data, etc.) need not be provided again. As compared to the paper based forms and their electronic equivalent, the present methods and systems create an intelligent form that is much easier to fill out, and the data used in the resulting electronic documents can be searched.

Embodiments described herein comprise:
1) A description language for the intelligent form creation
2) A decision tree comprising atoms of the form creation process (the intelligent form compiled)
3) One or more document templates corresponding to one or more decision trees
4) An authoring tool for creating/modifying the intelligent forms
5) An authoring tool for creating/modifying the document templates
6) A web application server (interpreter and document manager) processing the intelligent forms and generating the final documents.

The forms (decision trees) may be created in a form description language. Based on the language, it is possible to get a flexible flow control that is not hard coded in a program, to assign help to the form components at design time, to cross reference general data in different forms and different versions of the forms, and to generate both traditional documents and a searchable data repository based on the same user data. Because the form description (decision tree) is separated from the form filling process, maintaining the intelligent forms is a configuration problem, not a program modification whenever the form is changing.

The filling out of the form is controlled by the interpreter that uses the form description (decision tree) as a blueprint. The user data may be collected in an XML or similar structure. The document manager populates the associated template documents (Word, PDF, etc.) based on the user data. The document generation may be built on the top of the Microsoft technology of merging fields and the Adobe technology of interactive form fields. The (digitally signed) electronic document may provide an authentic, legally binding version for storage.

The electronic documents themselves are binary files often with proprietary, undisclosed structure and cannot be used for searching the contents. For this reason, the searchable XML structure (populated decision tree) is also stored and associated with each electronic document. The XML structure preserves the user's answers for each form. This allows for a fast textual search access in the archive. Once an XML structure is identified by the textual search, its related electronic document can be retrieved.

The profile of a user (e.g. name, address, title, access information, etc.) is collected through a special decision tree and is made available to all the other decision trees of the same application, so that the user does not have to type it again when filling out another form.

Implementing the logic of the form in the decision tree permits two features that are absent from the paper based approach and its electronic equivalent. First, the user does not have to bother with understanding the instructions because those are built in the decision tree and he has to fill only the fields relevant to his situation. Second, due to the fact that the information gathering process is separated from the document generation process, the important raw data can be stored and made accessible for further processing in a convenient XML format. This makes the form submission faster, reduces the time and manual effort for the error processing of errors introduced due to misunderstanding the instructions or the manual conversion process, and makes the raw data immediately available together with the submitted document.

By virtue of the foregoing, there is provided an improved electronic form management mechanism that enhances the traditional document management with the advantages of web based processing, knowledge management, and reusable data. These and other objects and advantages of the present disclosure shall be made apparent in the accompanying drawings and the descriptions thereof.

For example, in one embodiment, a method for generating a decision tree comprising one or more atoms of a form description language, wherein the decision tree represents questions facilitating the completion of a form having one or more data fields, comprises: inputting the questions into a computing device, wherein the questions relate to data to be filled into the one or more data fields of the form; arranging an order of the questions in the computing device based on possible answers given; and using the computing device to automatically generate the decision tree based on the questions, the possible answers, and the order of the questions.

In another embodiment, a method for generating an electronic document having data fields comprises: using a computing device to read and interpret a decision tree comprising atoms of a form description language, wherein the decision tree represents questions to be posed to a user, the questions relating to data to be filled into data fields of a form by the user; posing questions to the user according to an order specified by the decision tree; receiving answers from the user for each question posed, wherein each answer is associated with one or more data fields of the blank form; recording answers to the questions from the user in the computing device; using the computing device to automatically generate a populated decision tree comprising atoms of the form description language, wherein the populated decision tree represents the questions of the decision tree and the corresponding answers from the user; reading a computer-readable document template by the computing device, wherein the document template represents the document, and the document template comprises data fields corresponding to the data fields of the document; associating one or more answers to one or more data fields of the document template; and using the computing device to generate the electronic document by filling in some or all of the data fields of the document template with one or more associated answers.

In still another embodiment, a system comprises a storage device readable by a computer, wherein: the storage device embodies one or more instructions executable by the computer or by a second computer for generating a decision tree comprising one or more atoms of a form description language, wherein the decision tree represents questions facilitating the completion of a form having one or more data fields; and the generation of the decision tree comprises the steps of: inputting the questions into a computing device, wherein the questions relate to data to be filled into the one or more data fields of the form; arranging an order of the questions in the computing device based on possible answers given; and using the computing device to automatically generate the decision tree based on the questions, the possible answers, and the order of the questions.

BRIEF DESCRIPTION OF THE DRAWINGS

The accompanying drawings, which are incorporated in and constitute a part of this specification, illustrate an embodiment of the invention and, together with a general description of the invention given above and the detailed description of the embodiment given below, serve to explain the principles of the invention.

DETAILED DESCRIPTION

Figure 1A:
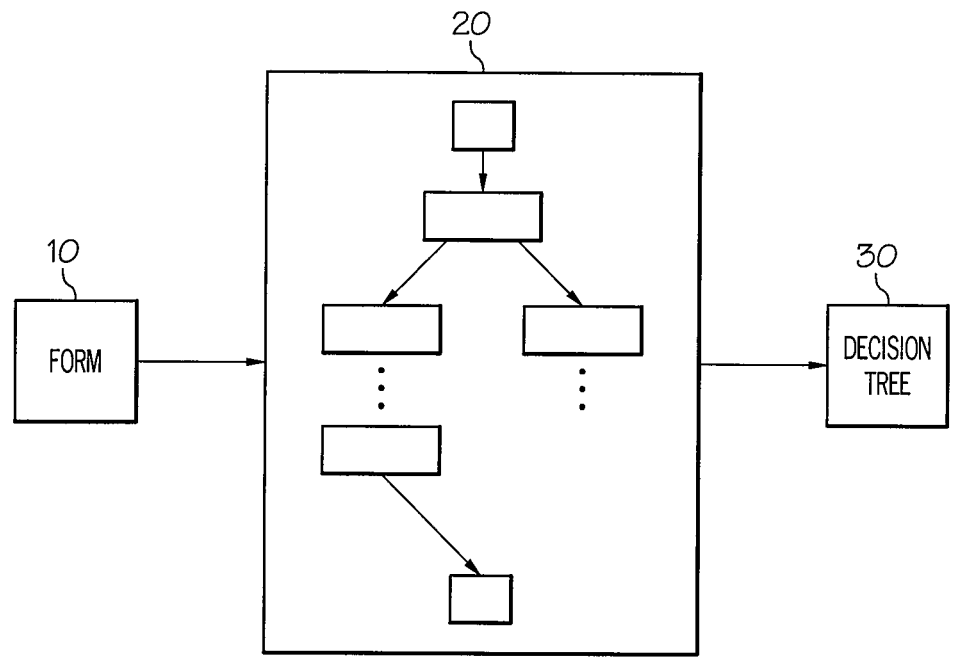
FIGS. 1A and 1B are block diagrams of the process of creating and filling out intelligent forms according to one or more embodiments shown and described herein.
Figure 1B:
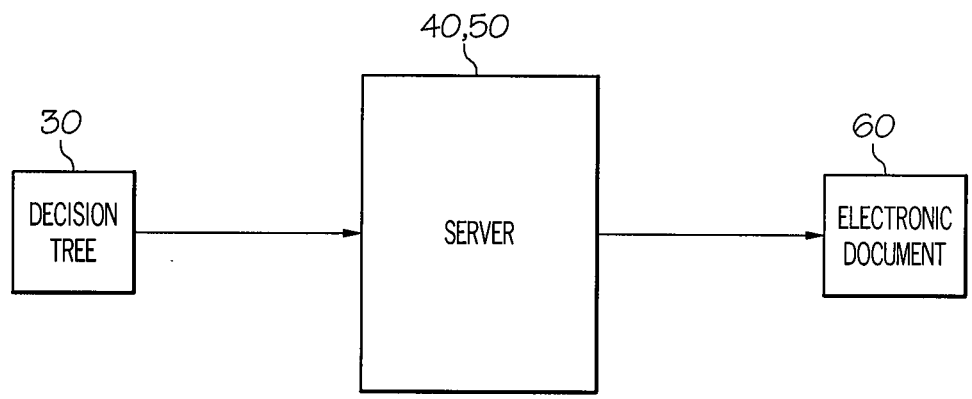

FIGS. 1A and 1B show the two main components of the intelligent form manipulation. FIG. 1A shows the authoring tool 20 for creating/modifying a decision tree 30. FIG. 1B shows a client-server based computer system, called a server 40, 50, that interprets the decision tree 30, poses the questions to the user, collects and interprets the answers, and generates the electronic documents 60. Both components of the system work with a version of the decision tree 30 that is built from the atoms of the form description language. The form description is a file that contains the graphical/logical specification of one decision tree 30.

Figure 2:
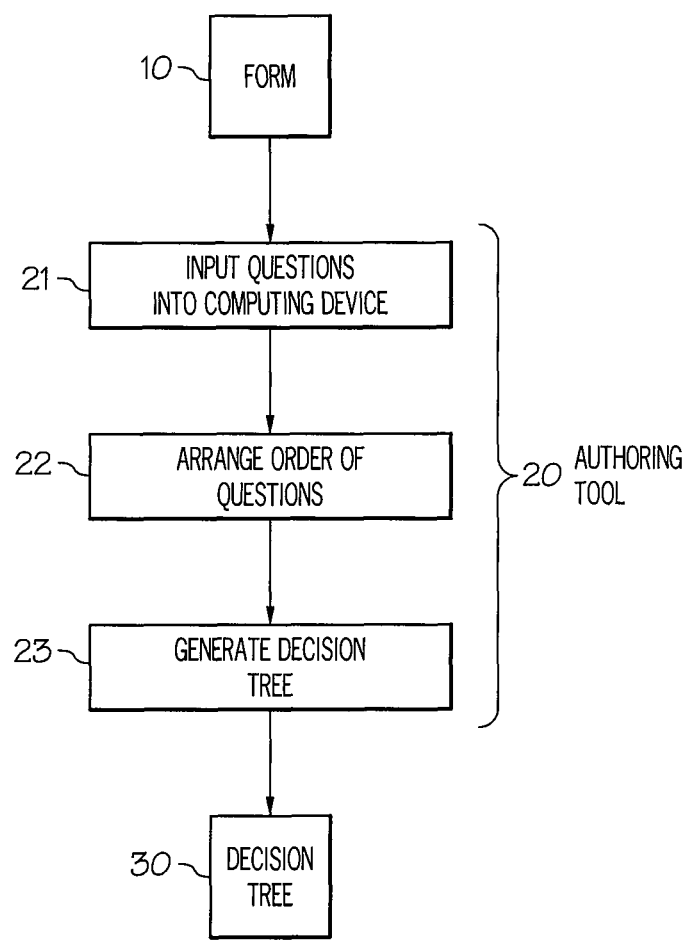
FIG. 2 is a block diagram showing the process of creating an intelligent form analogous to that of FIG. 1A according to one or more embodiments shown and described herein.

FIG. 2 shows one embodiment of a flow chart for the authoring tool 20 that is used for creating/modifying the decision trees 30. The authoring tool 20 may be a graphical editor that assigns a shape to each atom of the form description language. The form description is a file that contains the graphical/logical specification of one intelligent form. The graphical specification serves for allowing the user to view the decision tree as a block diagram of the atoms and show the flow control. It is believed that a graphical view simplifies the task of the form developer and makes the form description language easier to understand and use. When the decision tree 30 is complete, the graphical/logical specification is compiled into a more terse XML format that contains only the logical aspects of the form description. This compiled XML format is called a decision tree 30. The steps of the authoring tool may be performed on a computing device, such as a personal computer, a web-based server, or a smart phone. Other computing devices may be used as well.

The authoring tool 20 may be embodied in computer instructions which may be stored on a storage device, including but not limited to a hard disk, a CD (compact disc), a DVD (digital video disc), a memory chip, or a USB (Universal Serial Port) memory drive. Other types of storage devices may be used, as is known in the art.

The form 10 is used to create the decision tree 30 and may contain data fields which are to be filled in by the user. At step 21, the author inputs questions into the computing device which relate to the data to be filled into the data fields of the form. At step 22, the author arranges the order of the questions in the computing device based on possible answers to the questions. These may be simple yes/no answers or may be answers selected from a drop-down list, for example. Finally, at step 23, the author generates the decision tree 30 based on the questions, the possible answers, and the order of the questions.

Figure 3A:
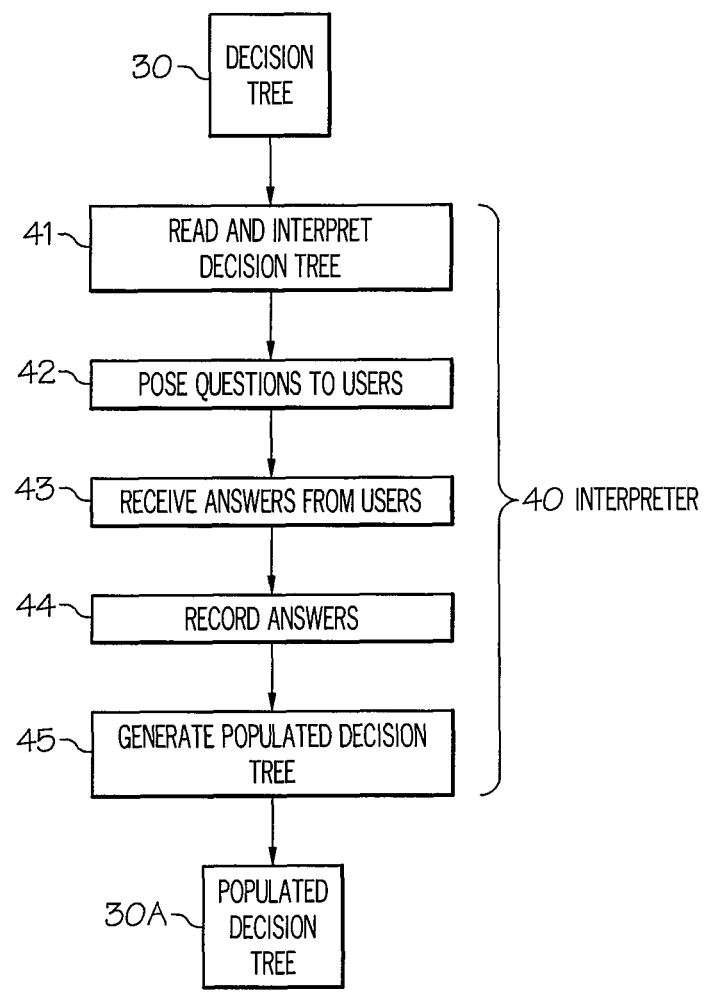
FIGS. 3A and 3B are diagrams showing the process of filling out an intelligent form analogous to that of FIG. 1B according to one or more embodiments shown and described herein.
Figure 3B:
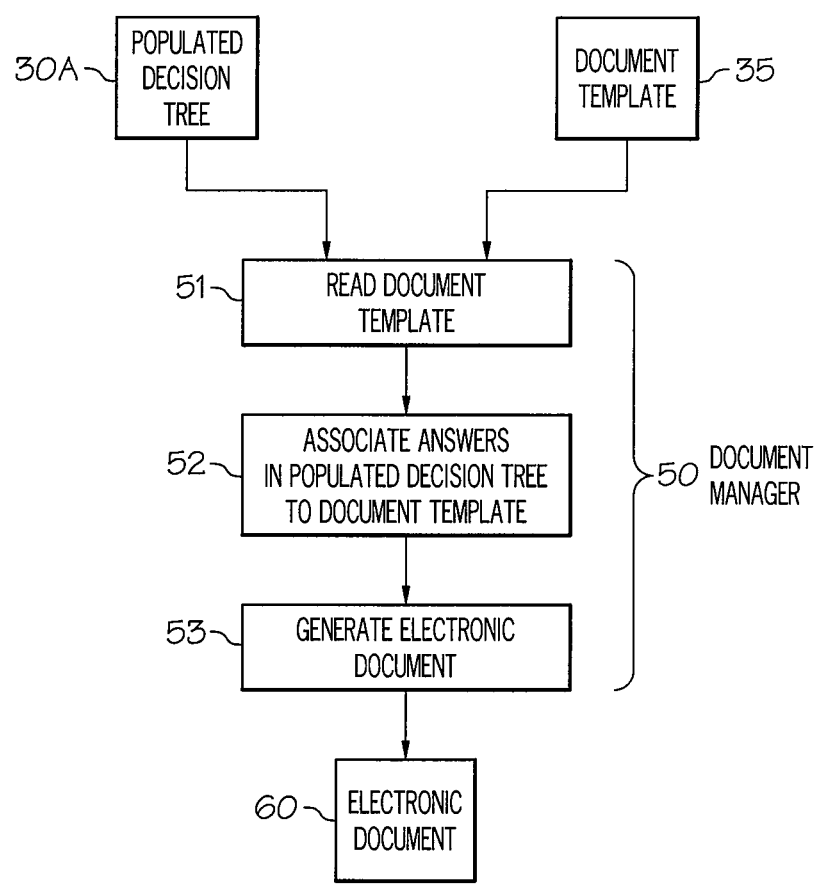

FIGS. 3A and 3B show the server 40, 50 that interprets decision tree 30, asks the questions from the user, collects and interprets the answers, and generates the electronic documents 60. In FIG. 3A, the decision tree 30 is interpreted and evaluated by the interpreter component of the server 40 at step 41. During this evaluation, the questions representing some of the fields of the document are presented to the user at step 42. The answers given by the user at step 43 and recorded at step 44. These answers are used to generate a populated decision 30A tree at step 45. Once the populated decision tree 30A has been evaluated, the document manager 50 generates the electronic document(s) 60 based on the document templates 35 assigned to the decision tree 30. The populated decision tree 30A is also preserved as a searchable XML structure in the document archive. At step 51, the document template 35 is read by the document manager 50. At step 52, the data fields of the document template 35 are associated to one or more answers stored in the populated decision tree 30A. Finally, at step 53, the electronic document 60 is generated.

The document template 35 contains pieces of fixed text and references to the saved fields in one or more decision trees 30. The document template 35 is an electronic document with empty data fields that will obtain their data by executing the corresponding populated decision trees 30A. As the result of the document generation, the user's answers are substituted into the fields of the document template 35. The result of this substitution is the electronic document 60.

Figure 4:
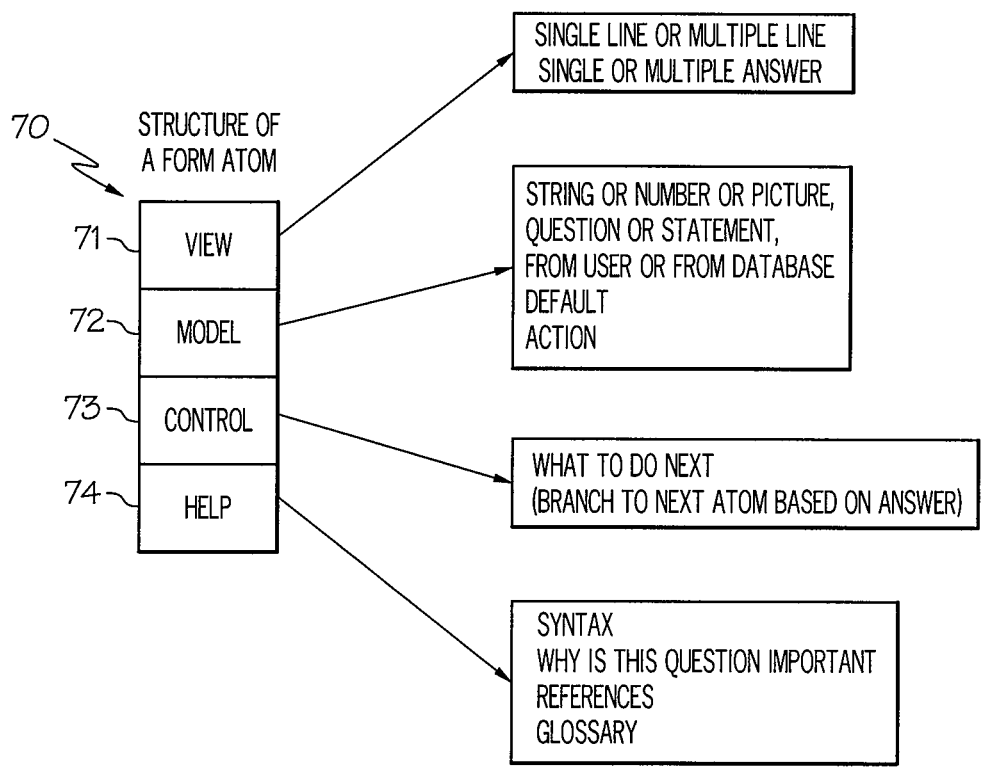
FIG. 4 is a structural diagram showing an atom from the form description language according to one or more embodiments shown and described herein.

FIG. 4 shows the structure of a form atom 70. A form atom 70 is an elementary unit in the form description language. An atom 70 of the form is, for example, a question, a comment, or a result. This atom is much like an MVC object (Model—the data being collected; View—how it looks on the screen when being collected; Control—how to get to the next question after this one), a term borrowed from object oriented programming. The form description language may assign four (or more) classes of attributes to a form atom:
1) View attribute 71—how the atom looks when the data is presented to the user, and/or is shown in the document (e.g., list or data field; checkbox or radio button)
2) Model attribute 72—how to collect and store the data obtained (e.g., type is string/number/date; identifier of the atom)
3) Control attribute 73—where to go next
4) Help attribute 74—local help, other explanation and references.

In general, an atom 70 represents a GUI widget that shows up on the user screen. For example, a question presented to the user is an atom 70. Its Model attribute 72 tells how the answer of the user will be identified in the rest of the processing of the form. The Model attribute 72 also gives the type of the user data (e.g., number, or string). The Model attribute 72 also gives unique identifier of the data as it will be referred in other parts of the form description and the document templates.

The View attribute 71 tells how the question is represented on the screen (e.g., what text is displayed, single or multiple line input field). The View attribute 71 of the atom 70 can be used both for the screen of the application and for the generated document. This integration of view between the HTML-based web view and the document view is also a significant part of the invention. As the web view is primarily HTML, an atom 70 that is a result of partially processed answers can be represented as a table in the HTML view, and a table in the document. This reuse of the processed data inside the document ensures that all the logic processing is done in the decision tree, and not repeated when creating the document.

The Control attribute 73 defines how to continue the form processing. For example, if the user has a list of choices to select from, the Control attribute 73 specifies how to proceed after each choice.

The Help attribute 74 gives syntax help, examples, localized explanation about the question, the concepts involved, and further references in the format of hyperlinks to Web resources or to the glossary file.

A form atom 70 can represent a visible or non-visible component. The visible atoms have View attributes 71 and Help attributes 74. A non-visible atom does not have View and Help attributes. The atom 70 might be associated with a saved data field that contains the result of the user interaction or some aggregation action. An atom 70 that is visible in the filling out process (i.e., in the web view) might not be visible in the filled out form. For example, an atom may represent an aggregate of other collected data. Such atom is not necessarily visible in the web view, but may be visible in the completed form (i.e., the summary of expenses).

A form atom 70 may also have a saved data field with a name. A saved data field is typically used to provide a value for one or more data fields with a same name in the document template. The saved data fields represent the variables in the form description language. Most such saved fields get their value from the user, but some of them get their value as a result of calculations that may or may not use values provided by the user (e.g., data retrieved from a database). Note that the saved data fields are globally visible in the decision tree and can be referred to in the View attribute 71, Model attribute 72, Control attribute 73, or Help attribute 74 of another atom, as well.

Figure 5:
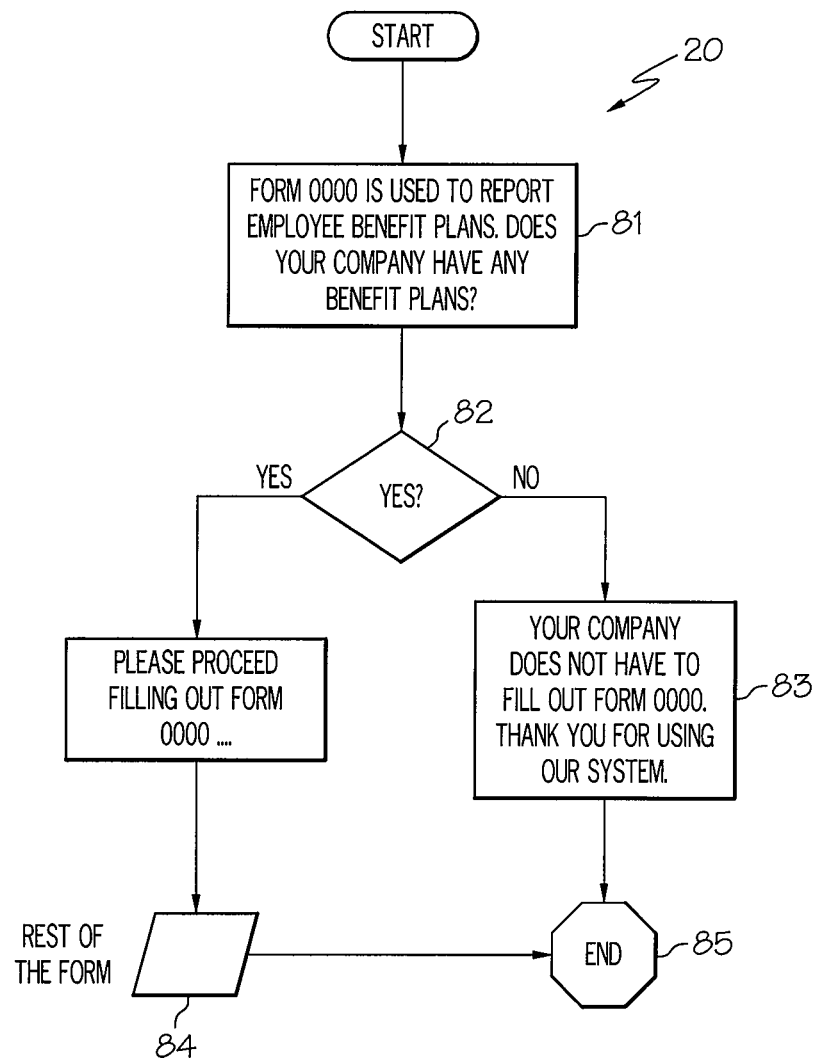
FIG. 5 is an example of an intelligent form as it looks in the authorizing tool as related to FIGS. 3 and 4 according to one or more embodiments shown and described herein.

FIG. 5 shows a simple example of an authoring tool 20. This form asks, as an example, the type of company and notifies the user that this company is obliged to fill out the rest of the form or not. In the authoring tool 20, the parts of a decision tree are represented by different shapes. The control flow among the atoms may be represented by the arrows. The form description may have an initial start shape and has one or more end shapes.

An exemplary form starts with a question 81 to the user. The question shape is represented as a rounded rectangle. After the user has answered, the answer is examined at step 82. The lozenge shape represents an atom that is not visible to the user. This is a hidden atom that examines an answer and changes the control flow accordingly. If the user has selected No, then a final acknowledgement is shown at step 83, and the form is completed. If the user has selected Yes, then the control flows towards asking more questions at step 84. This part is not detailed, but represented by the parallelogram. After the end atom is reached, the evaluation of the form stops at step 85 and the documents are created based on the user's answers and the document templates.

Some of the atoms that may be a useful part of the form description langue are given in the following:
1) start—indicates where the processing of the form starts
2) end—indicates where the processing of the form stops
3) question—the user has to give an answer (string or file, etc.)
4) choice—the user gets a list of possible answers to choose from
5) condition—the value of an atom is tested against a condition
6) note—some text is shown to the user for his/her information
7) field assign—an atom gets a value behind the scene, often an aggregated value
8) branch—the control flows from one atom to another
9) sub-tree—in reference to another form that is evaluated at this point; the values established by the atoms in the sub-tree are visible to the invoking top level form.
10) image—an image is shown or uploaded
11) file—a file is uploaded
12) document—a document is generated
13) digital signature—a digital signature to be applied to the generated document.

The format of the shapes is not specified by this disclosure. The shapes may assume any suitable form, and the form description language is still operates in the same manner. Furthermore, though some atoms are given as example in the disclosure, the list above is not an exclusive list. Additional atoms can be described, and the list of atoms can be extended. This disclosure provides the concept of the form description language and the structure of an atom in the language.

Moreover, while many of the embodiments described herein are in the context of a web environment, those skilled in the art will appreciate that the various embodiments of the invention are capable of being distributed as a program product in a variety of forms, and that the embodiments apply equally regardless of the particular type of system (web application, network application, or single computer application).

In addition, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments are not limited to the specific organization and allocation of program functionality described herein.

Additional advantages and modifications will readily appear to those skilled in the art. For instance, additional atoms in the form language can be easily described. However, it is important that the form may be described in a decision tree as opposed to being embedded in the code of a program. Adding new atoms to the form description language can be considered as an extension of the disclosure, not as a novel or separate. Thus, the embodiments in their broader aspect are, therefore, not limited to the specific details, representative systems and methods, and illustrative example shown and described. Accordingly, departures may be made from such details without departing from the spirit or scope of the applicant's general inventive concept.

While particular embodiments and aspects of the present invention have been illustrated and described herein, various other changes and modifications may be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method for generating a plurality of decision trees comprising one or more atoms of a form description language, the method comprising:
   providing an authoring tool that is configured as a graphical editor that provides an author with an interface to input a plurality of questions related to at least one form via a first plurality of shapes, wherein a position of the first plurality of shapes dictates a desired order of the plurality of questions and possible answers that a user might provide, wherein at least a portion of the plurality of questions are different than a field in the form;
   receiving the questions and an arrangement of the first plurality of shapes from an author, by the authoring tool via the first plurality of shapes, wherein the questions include a first question that is related to selection of the form selected from a plurality of forms to be used, and a second question that is related to data requested in the form identified by the user in answering the first question;
   determining an order of the questions based on the arrangement of the shapes made by the author;
   automatically generating, by the computing device utilizing the authoring tool, a first decision tree based on the questions, the data, the possible answers, and the order of the questions;
   assigning a plurality of document templates to the first decision tree;
   utilizing the authoring tool to automatically generate, by the computing device, a second decision tree, wherein the second decision tree is generated from a second plurality of shapes;
   receiving, from the user, user profile data through a second decision tree, wherein the second decision tree is utilized for populating a different form;
   providing at least a portion of the plurality of questions to a user;
   receiving, from the user, at least one answer associated with the provided questions;
   interpreting the answers associated with the questions to determine a value for populating the different form;
   generating a populated decision tree from the answers;
   determining a conclusion based on the answers;
   providing details about the conclusion to the user; and
   populating the different form based on the populated decision tree, the plurality of document templates, and the user profile data that was received via the second decision tree.

2. The method of claim 1 wherein each question of the first decision tree is represented by an atom, wherein the atom comprises a view attribute that defines a manner in which the atom is presented, a model attribute that defines a manner to collect and store obtained data, a control attribute that defines a next step after a respective question is answered, and a help attribute that provides an explanation of the atom.

3. The method of claim 1 wherein the form description language is Extensible Markup Language (XML).

4. The method of claim 1 wherein at least one atom of the form description language comprises a plurality of attributes, wherein:
   the at least one atom is associated with one or more questions;
   a first attribute associates one or more answers with the field of the form;
   a second attribute determines how the one or more questions will appear to the user;
   a third attribute determines which question will be posed next, based on answers received; and
   a fourth attribute explains the one or more questions to the user.

5. The method of claim 1 wherein one of the answers to one of the questions is associated with one of the data fields of at least one of the plurality of document templates, wherein the document template is a computer-readable file representing the form, and one of the data fields of the document template corresponds to one of the data fields of the form.

6. A method for generating an electronic document having data fields, comprising:
   providing an authoring tool that is configured as a graphical editor provides an author with an interface to input a plurality of questions related to at least one form via a first plurality of shapes, wherein a position of the first plurality of shapes dictates a desired order of the plurality of questions and possible answers that a user might provide, wherein at least a portion of the plurality of questions are different than a field in the form;
   receiving the position of the first plurality of shapes from the user;
   automatically generating utilizing the authoring tool, a first decision tree based on the questions, the data, the possible answers, and the order of questions;
   using a computing device to read and interpret the first decision tree comprising atoms of a form description language, wherein the first decision tree represents the plurality of questions to be posed to a user, the plurality of questions including a first question related to the form selected from a plurality of forms to be used and a second question related to data to be filled into another field of the form identified by the user in answering the first question, wherein at least one of the atoms comprise a view attribute that defines a manner in which the atom is presented, a model attribute that defines a manner to collect and store obtained data, a control attribute that defines a next step after a respective question is answered, and a help attribute that provides an explanation of the atom;
   posing at least a portion of the plurality of questions to the user according to an order specified by the decision tree;
   receiving answers from the user for at least a portion of the question posed, wherein each answer is associated with one or more of the fields of the form;
   receiving, from the user, user profile data through a second decision tree, wherein the second decision tree, wherein the second decision tree is generated from a second plurality of shapes, wherein the second decision tree is made available to a different form;
   determining conclusions from the answers;

providing details about the conclusions to the user;
recording answers to the questions from the user in the computing device;
using the computing device to automatically generate a populated decision tree comprising atoms of the form description language, wherein the populated decision tree represents the questions of the decision tree, the user profile data, and the corresponding answers from the user;
associating the answers from the user to one or more data fields of the document template;
interpreting the answers associated with the questions to determine a value for populating the different form; and
using the computing device to generate a completed electronic document by populating a blank document template that represents the form with at least one of the associated answers, wherein the completed electronic document is generated using the populated decision tree, the document template, and the user profile data that was received via the second decision tree.

7. The method of claim 6 wherein each question and corresponding answer of the populated decision tree are represented by an atom.

8. The method of claim 6, wherein the form description language is Extensible Markup Language (XML).

9. The method of claim 6, wherein at least one atom of the form description language comprises a plurality of attributes, wherein:
the at least one atom is associated with one or more questions;
a first attribute associates one or more answers with one or more of the fields of the form;
a second attribute determines how the one or more questions will appear to the user;
a third attribute determines which question will be posed next, based on answers received; and
a fourth attribute explains the one or more questions to the user.

10. The method of claim 6, wherein the populated decision tree is searchable by a search engine.

11. The method of claim 6 further comprising storing the electronic document in an archive, wherein the archive is operable to store one or more versions of the same electronic document.

12. The method of claim 6 further comprising:
associating one of the answers received from the user with one or more data fields of a second electronic document;
recognizing the one or more data fields of the second electronic document must be modified, based on the associated answer received from the user; and
modifying the one or more data fields of the second electronic document, based on the associated answer received from the user.

13. A system comprising a storage device readable by a computer, wherein:
the storage device embodies one or more instructions executable by the computer for performing the following:
providing an authoring tool that is configured as a graphical editor that provides an author with an interface to input a plurality of questions related to at least one form via a first plurality of shapes, wherein a position of the first plurality of shapes dictates a desired order of the plurality of questions and possible answers that a user might provide, wherein at least a portion of the plurality of questions are different than a field in the form; and
receiving the position of the first plurality of shapes from the user; and
generating a plurality of decision trees comprising one or more atoms of a form description language, wherein the plurality of decision trees represent the plurality of questions facilitating completion of the form having one or more data fields, wherein at least one of the atoms comprise a view attribute that defines a manner in which the atom is presented, a model attribute that defines a manner to collect and store obtained data, a control attribute that defines a next step after a respective question is answered, and a help attribute that provides an explanation of the atom; and
wherein the generation of the plurality of decision trees comprises the steps of:
receiving the plurality of questions by the computing device, wherein the plurality of questions relate to data requested in the form;
arranging an order of the questions, based on an arrangement of the first plurality of shapes;
using the computing device to automatically generate a first decision tree based on the plurality of questions, the possible answers, and the order of the questions; and
receiving user profile data through a second decision tree, wherein the second decision tree is made available to a different form, wherein the second decision tree is generated utilizing a second plurality of shapes;
assigning a plurality of document templates to the first decision tree;
receiving answers associated with the questions;
determining conclusions related to the answers;
providing details of the conclusions to the user;
interpreting the answers associated with the questions to determine a value for populating the different form; and
populating the different form based on the populated first decision tree, the plurality of document templates, and the user profile data that was received via the second decision tree.

14. The system of claim 13 wherein each question of the first decision tree is represented by an atom.

15. The system of claim 13 wherein the form description language is Extensible Markup Language (XML).

16. The system of claim 13 wherein at least one atom of the form description language comprises a plurality attributes, wherein:
the at least one atom is associated with one or more questions;
a first attribute associates one or more answers with one or more data fields of the form;
a second attribute determines how the one or more questions will appear to the user;
a third attribute determines which question will be posed next, based on answers received; and
a fourth attribute explains the one or more questions to the user.

17. The system of claim 13 wherein one of the answers to one of the questions of the first decision tree is associated with one of the data fields of a document template, wherein the document template is a computer-readable file representing the form, and one of the data fields of the document template corresponds to one of the data fields of the form.

18. The method of claim 13 wherein the second decision tree is available to populate the different form with the user profile data.

* * * * *